H. R. EVANS.
MEANS FOR JOINING PHOTOGRAPHIC FILMS.
APPLICATION FILED JUNE 24, 1915.

1,259,500.

Patented Mar. 19, 1918.
3 SHEETS—SHEET 1.

H. R. EVANS.
MEANS FOR JOINING PHOTOGRAPHIC FILMS.
APPLICATION FILED JUNE 24, 1915.

1,259,500.

Patented Mar. 19, 1918.
3 SHEETS—SHEET 2.

Witnesses
L. U. Guckl.
J. B. Fleming

Inventor
H. R. Evans
by Bakewell, Byrnes & Parmelee
attys

H. R. EVANS.
MEANS FOR JOINING PHOTOGRAPHIC FILMS.
APPLICATION FILED JUNE 24, 1915.

1,259,500.

Patented Mar. 19, 1918.
3 SHEETS—SHEET 3.

Witnesses

Inventor
H. R. Evans

UNITED STATES PATENT OFFICE.

HENRY RIEGEL EVANS, OF LONDON, ENGLAND.

MEANS FOR JOINING PHOTOGRAPHIC FILMS.

1,259,500.

Specification of Letters Patent.

Patented Mar. 19, 1918.

Application filed June 24, 1915. Serial No. 36,155.

*To all whom it may concern:*

Be it known that I, HENRY RIEGEL EVANS, a citizen of the United States of America, a resident of 60 Clarence Gate Gardens, Regent's Park, London, N. W., England, have invented certain new and useful Improvements in Means for Joining Photographic Films, of which the following is a specification.

This invention relates to means for joining photographic films and in particular cinematograph films.

A film-splicing machine according to this invention comprises as its principal characteristics the combination of film-supports, a clamp apart from them, and mechanism to produce such relative motion between them as will first juxtapose the supports and the clamp and next separate them into their original relative positions, and at the end of the juxtaposing operation will transfer the film-ends from the supports into the clamp and by the separating operation will place the supports in their original position of readiness, so that a succeeding cycle of action of the machine can be initiated without awaiting the completion of the treatment in the machine of the joint commenced in the preceding cycle, thus saving time as compared with that occupied in machines in which the periods of successive cycles, each of a complete cutting and overlaying or abutting of the film-ends, cannot have their durations overlapped. The relatively movable parts actuated in the course of the said juxtaposing operation can conveniently be caused, according to the present invention, to actuate the emulsion-removing and adhesive-applying devices, preferably simultaneously.

In order to insure accurate and rapid work a pin registering-device is employed to hold the two film-ends in a predetermined overlapping position with a clamp which presses and holds the overlapped portions together and means automatically to disengage the registering-pins from the film after the clamp has been applied. Trimmers may be employed to coöperate with the pin-registering device and to trim the ends of the film to a predetermined length from the registering-pins and therewith means to bring the pin-registering devices together in such a way that the film-ends overlap by a predetermined amount.

In addition to the emulsion-remover, means for applying adhesive are preferably provided, so that adhesive is applied to one end of the film, while on the registering-pins prior to the two ends being clamped together; preferably one end has emulsion removed and the other end receives adhesive.

Other features of novelty in this invention will hereinafter appear and are pointed out in the claims.

In the accompanying drawings one construction of machine is shown and is hereinafter described; in the drawings.

Figure 1:
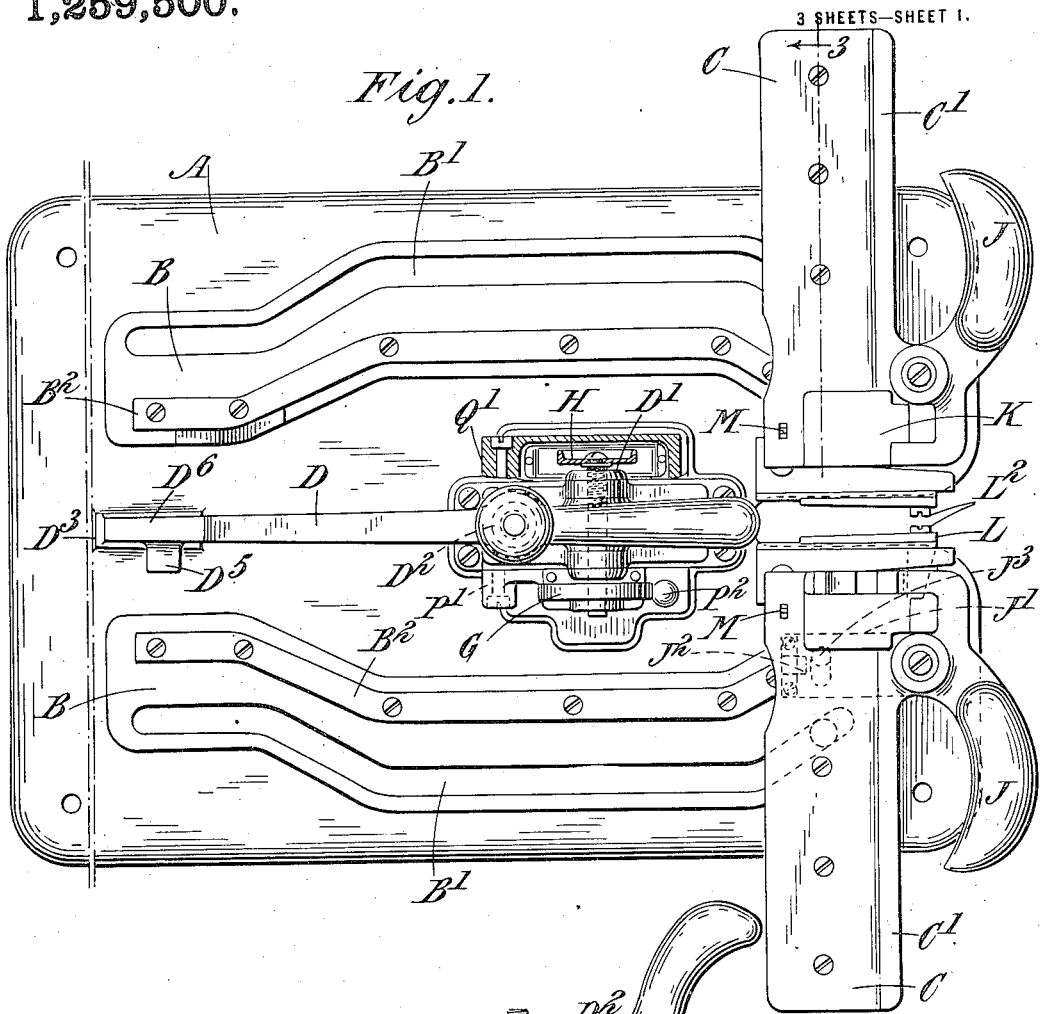
Figure 1 is a plan of the complete machine.
Figure 2:
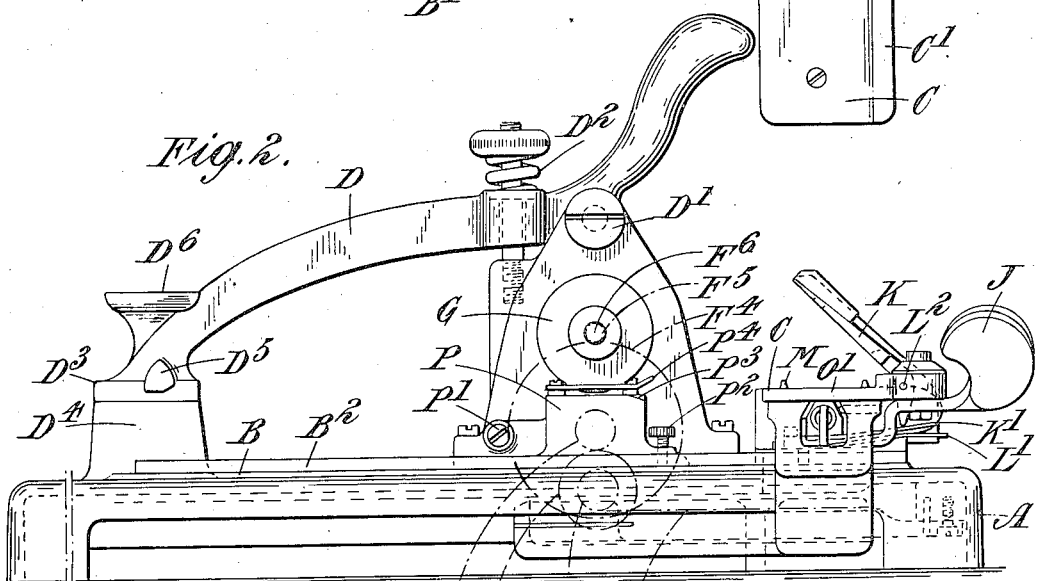
Fig. 2 is a side elevation thereof.
Figure 3:
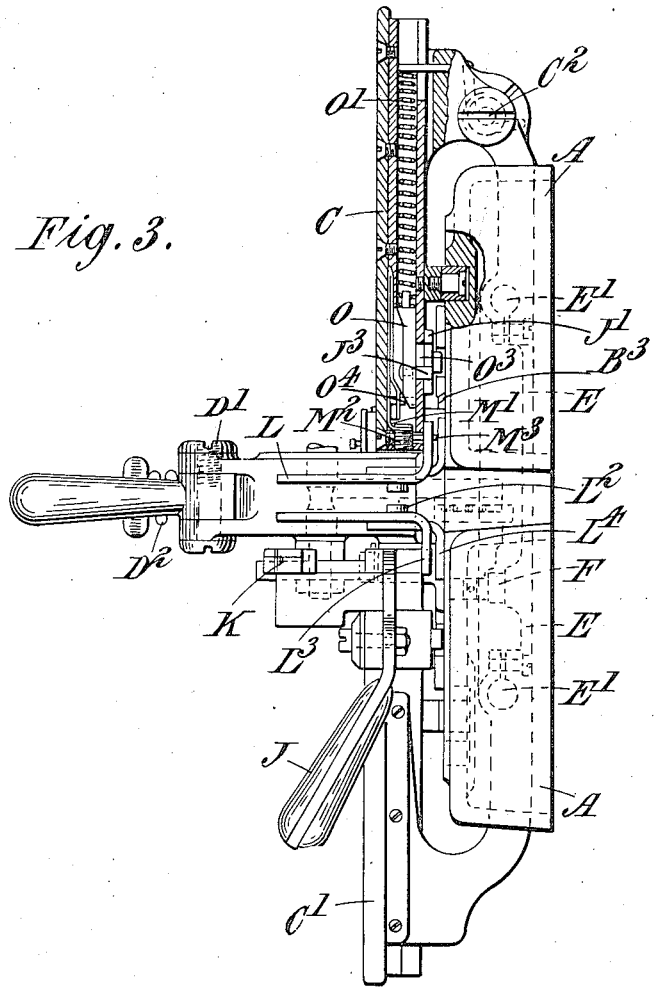
Figures 7, 8:
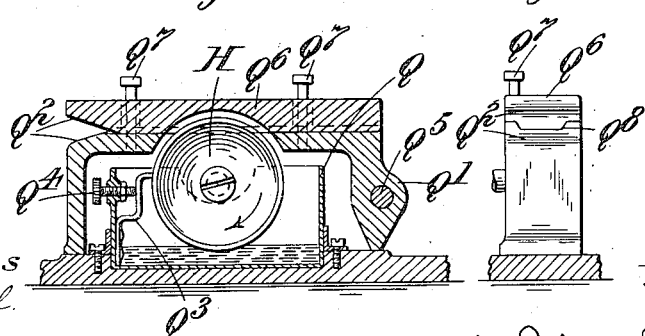
Figure 4:
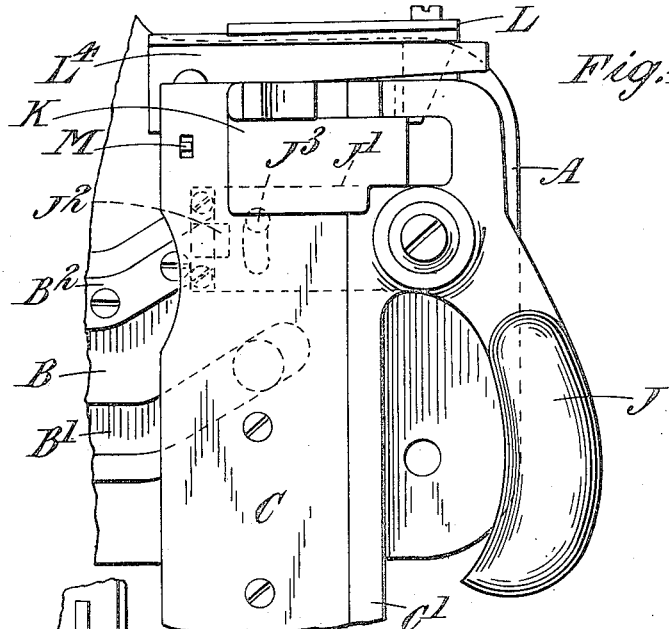
Figure 5:
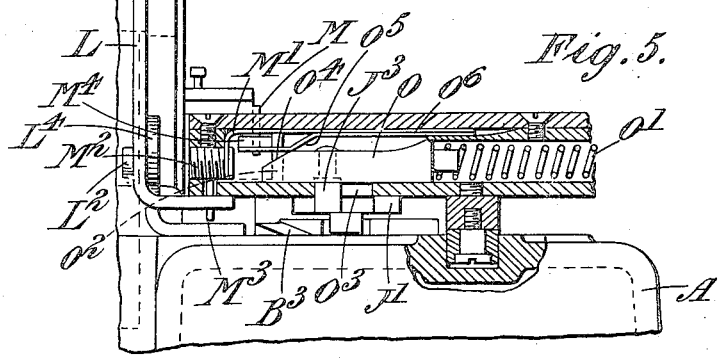
Figure 6:
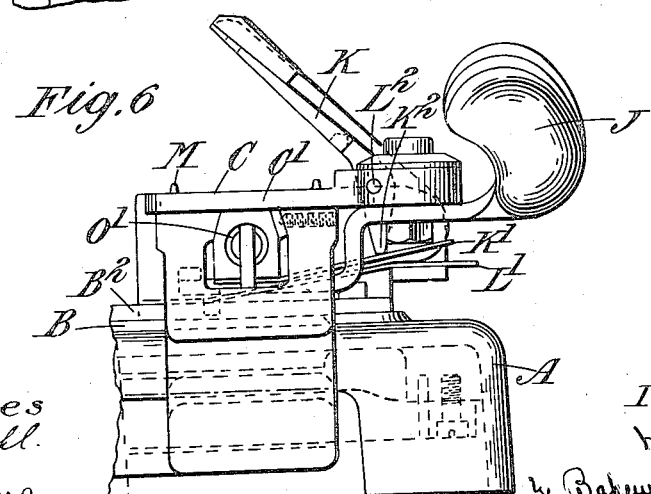

Fig. 3 an end elevation in part section on the line 3—3 of Fig. 1;

Figs. 4, 5 and 6 are views to a larger scale than Figs. 1 and 3 of portions of Figs. 1, 3 and 2 respectively; and Figs. 7 and 8 are detail views of the adhesive-applier.

Upon a base A are provided guideways B, two in number, on each of which moves a film-carrier C, and centrally on the base is a pivoted clamping arm D. The two carriers are mounted upon an under-carriage E which passes beneath the base A and so insures that the two carriers move together in a direction lengthwise of the machine; the under carriage is guided upon two guide rods $E^1$. Each carrier is so mounted upon the under-carriage as to be capable of sliding laterally of the machine to give, as between the two carriers, a movement of approach and withdrawal from one another. Upon the under carriage is a rack F which gears with a wheel $F^1$ which is the first member of a train $F^1$, $F^2$, $F^3$, $F^4$, $F^5$ to give a multiplying motion and rapid revolution of the spindle $F^6$ upon which the last member of the train is mounted; on this spindle is also mounted a scratch-brush G and upon an extension of the spindle which carries the wheels $F^3$, $F^4$ is an adhesive-applying wheel H; the wheels G and H are hereinafter more particularly referred to.

The two carriers C are similar to one another with one small exception hereinafter to be referred to and reference is now made to the left-hand carrier, that is to say, the one seen in elevation in Fig. 3. A handle J is pivoted to the carrier about a vertical axis and a spring controlled clamp K is also pivoted to the carrier about a horizontal axis. In front of the carrier is a pair of shears formed of two members L, L⁴ pivoted together at L² and secured to the base by an extension of the member L⁴, which extension is bent at right angles to the rest of the member; the extension is secured to the base by screws passing through holes, not seen in the drawing, which are elongated to permit of slight adjustment toward and away from the carrier.

Each handle J has an extension J¹ (see Fig. 1) extending forwardly beneath the carrier and provided with a hard steel block J² removably secured to it to permit of renewal in case of wear or breakage. The extension J¹ engages by means of a curved slot with a pin J³ which limits the pivotal movement of the handle about its pivot. A plate-spring K¹ bears upon a heel K² on the clamp K and serves to hold it both in the applied and in the released position as may be required. The shear L is normally held in the raised position by a plate-spring L¹ but the handle J is provided with a projection to engage with a heel L³ of the shear so that by pivotal movement about its center, the handle J causes the shear L to descend by movement about its own pivot L²; the same movement of the handle throws the projection J² in a direction toward the other carrier and into a position to clear a rail B² on the guideway; each guideway B comprises a channel B¹ constituting a cam groove and a raised rail B² whose general outline conforms closely with that of the cam groove; it is with this raised rail B² that the block J² engages until cleared by rotation of the handle J about its pivot.

Each carrier has a raised edge C¹ to serve as a guide to insure proper alinement of the two film-ends. Moreover in each carrier C are two pins M to constitute a registering device which shall coöperate with the perforations in the edges of the film thus insuring register. The pins are movably mounted and automatically raised and lowered, the details of this part of the construction being more fully referred to hereinafter.

The arm D is pivoted at D¹ and is held down by a spring D² in compression so that a presser foot D³ on the free extremity of the arm tends constantly to press upon a block D⁴. Upon the arm is a nose piece D⁵ and a table D⁶, both hereinafter more particularly referred to.

Broadly the operation of the machine is as follows:—The two ends of the film to be joined together are laid, one upon one and the other upon the other of the carriers C in such a position that when the pins M engage with perforations in the film-ends, the portions which project over the opposed faces of the carriers are suitably placed for being trimmed and joined in correct register. The machine is conveniently so constructed that the spacing of the carriers is equal to the length of one picture since it provides for quick and accurate excision of a damaged picture and rejoining of the film. The operator then, lowers the clamp K on to the film and presses upon the handles J—J in a direction to thrust the carriers C—C toward the other end of the machine. The pressure on the handles J cannot shift the carriers until the blocks J² have cleared the ends of the rails B²; this occurs as the handles yield to the pressure and rotate about their pivots; this latter movement also brings down the raised shears L thereby trimming both ends of the films correctly and automatically. This shearing action is completed before the blocks J² have moved clear of the rails and when these are cleared the two carriers can move in unison, under the pressure upon the handles, toward the other end of the machine. They move together owing to the connection afforded by the under-carriage. The engagement of the rack F upon the latter with the train of gearing causes rotation to be imparted to the train of wheels F¹ to F⁵ and thus to the scratch-brush G and adhesive-applier H. As the carriers pass these, one carrier causes its film-end to pass beneath the scratch-brush while the other causes its end to pass over the adhesive-applier; the film-ends have both been placed emulsion upward upon the carriers. The details of the scratch-brush and adhesive-applier are hereinafter described but after leaving them the two ends of film are duly prepared for being joined. The carriers in continuing their movement now approach one another by reason of the shape of the guideways. At this point the difference above referred to between the two carriers comes into operation. The right-hand carrier is pivoted at C² so that the free end is capable of a small upward movement; within the guide rail for this carrier is a small cam B³ in the form of a block having two inclined faces. As the right-hand carrier approaches this block, it rides upon it by tilting about the pivot C² and so lifts the film-end which it carries above the other film-end. The other carrier engages with the nose-piece D⁵ and lifts the presser-foot D³ clear of the block D⁴. The guideways cause the two carriers to approach one another and by this means the film-ends are made to overlap by the correct amount, are brought between the foot D³ and block D⁴ and finally as the left-hand carrier clears the nose-piece D⁵ the presser foot descends upon the overlapping ends of the film and holds that together by the pressure of the spring D². As the right-hand carrier passed the block B³ the right-hand film end descended upon the left-hand one before the presser foot descended upon them. Should there already be a film joint in position under the clamp it is pushed out by the arrival of the new ends to be joined.

The operator now reverses the pressure upon the handles to return the carriers to their former position. The first effect of this reversal of pressure is to lower the pins M and to lift the clamps K K and so release the film enabling the carriers to be returned while leaving the film end under the clamp. These operations occur automatically by reason of the following constructions.

Each pin is carried upon a thin plate spring $M^1$ (see Fig. 5) having a downturned forked end which engages with a screw $M^2$ so that the latter is free to rotate but in its traversing movement carries the spring $M^1$ with it. The screw is given a movement of rotation by a downwardly depending tommy $M^3$ which projects through a slot in the body of the carrier of sufficient dimensions to give the required movement, which is very small; the object of this part of the construction is to provide for adjustment to allow for the small variations in pitch of the perforations which occur in practice. The slot through which each pin projects through the upper surface of its carrier is made slightly larger than the pin to allow for this adjustment. Within the body of each carrier is a block O impelled toward the face of the carrier by a spring $O^1$ in compression. The pin $J^3$ seen in Fig. 4 is carried by the block O, as seen in Fig. 5, and projects through a slot $O^3$ in the under side of the carrier into a curved slot, already referred to, in the extension $J^1$ of the handle. At its forward end the block carries a T-headed pin $O^2$ whose head engages with a flexible plate member $O^6$ riveted at its rear end to the plate $M^1$. At its forward end it carries a block $M^4$ into which the pins M are driven and by it are held and supported. The pin $O^2$ passes through a slot in the member $O^6$ and the latter has an inclined portion at $O^5$ corresponding with an inclined face on the front end of the block O. The object of this arrangement is to raise and lower the pins M by a positive action which occurs in the following way:—the return movement of a handle J with its extension $J^1$ throws its pin $J^3$ to the other end of the slot $O^3$ from that in which it is seen in Fig. 5. This shifts the block O and as the latter carries the pin $O^2$ on to the inclined portion $O^5$ of the flexible member $O^6$ it presses the latter down so carrying the block $M^4$ and pins M downward, thus withdrawing the latter from engagement with the film. On the return movement the front inclined face $O^4$ of the block O strikes the under face of the incline $O^5$ and forces the pins up so that the latter are positively operated in both directions. The connection between the plate $M^1$ and the plate $O^6$ enables the latter to be adjusted in the manner described when the former is shifted by the screw $M^2$. The reversal of pressure upon the handles J to return them to the starting position in swinging the extension $J^1$ in the manner just described throws the block $J^2$ across the end of the rail $B^2$ so preventing the carriers returning until the swinging of the handles has been completed at which stage both the blocks $J^2$ will have cleared the rails $B^2$ and be thrown to the outer faces of this latter. On the return movement, therefore, the blocks $J^2$ return on those faces of the rails which are toward the grooves $B^1$ and the handles are therefore locked against return to the position shown in Fig. 4 until they have reached the starting end of the rails $B^2$.

The lifting of the clamps K preparatory to the return movement is effected by engagement of a portion of the handle with the heels $K^2$ of the clamps; the clamps are thus lifted before the blocks $J^2$ have cleared the rails.

The scratch-brush is provided with an operating table P pivoted at $P^1$ and adjustable about the pivot by a screw $P^2$ to allow for wear of the scratch-brush and to determine the amount of emulsion removed. The striking edge of the table is beveled as at $P^3$ and is provided with a plate guard $P^4$ between which and the table the film is received and guided.

The wheel H by which adhesive is applied revolves within a container Q housed beneath a hinged cover $Q^1$; the latter is hinged at $Q^5$ to the body of the machine. The cover carries a loose lid $Q^6$ capable of sliding upon guide pins $Q^7$ passing somewhat loosely through holes in the lid. The striking edges of the lid and cover are beveled as at $Q^2$ so that as the film approaches this portion of the apparatus the lid is lifted. The central portion of the lid and cover are shaped as seen at $Q^8$ in end view so that after the film has passed the wheel and has had adhesive applied to it it can clear the top face of the cover without being scraped and having adhesive removed and yet at the same time the lid is a close fit upon the cover so as effectually to prevent evaporation. A scraper $Q^3$ adjustable by a screw $Q^4$ is provided to determine the amount of adhesive carried upon the wheel.

An advantage of this construction is that evaporation of the solvent is very effectively checked and yet by rotating the whole cover about the hinge $Q^5$ the container can at once be inspected and if necessary either adjusted or removed bodily and a clean one substituted therefor.

The shears are normally spaced apart by about a picture's length, three-quarters of the actual pitch of the pictures being a convenient distance as it allows an overlap of about ¼ of the picture. By slightly shifting the shears toward and away from the faces of their respective carriers the amount of film left to overlap the other can be regulated. The slot left in the base plate between the faces of the carriers is, as seen in Fig. 1 to permit the trimmed ends to fall clear of the apparatus into a receptacle placed beneath, if desired. The scratch-brush may be made with blade-like "bristles" of metallic ribbon or may be replaced by a milling cutter.

The function of the table $D^6$ is to serve as a support for the film while the join is drying. It is sometimes desirable to carry the body of the film from one side of the machine across to the other and this is liable to give rise to strain of the join and throw the two pieces out of alinement with one another. If, however, the film is laid across the table $D^6$ the risk of such strain or distortion is largely eliminated.

The details of the hereinbefore described construction may be variously modified without departing from the spirit and scope of this invention. For example where relative motion is required either of the two portions considered may be made stationary and the other movable or both may partake in the movement.

What I claim as my invention and desire to secure by Letters Patent is:—

1. An apparatus for joining photographic films, comprising film-end carriers, a joint clamp, means for directing said carriers and clamp relative to each other, and means to move the carriers toward and from each other to place the ends of the film under the clamp.

2. An apparatus for joining photographic films, comprising film-end carriers, a joint clamp, means to move said carriers toward each other, means to remove emulsion from one film end, and means to apply adhesive to another film end.

3. An apparatus for joining photographic films, comprising film-end carriers, a joint clamp, means for directing said carriers toward and from the clamp to place the film ends under the clamp, and means for holding the clamp closed on the film ends while the carriers are moving away from and toward the clamp.

4. An apparatus for joining photographic films, comprising film-end carriers, a joint clamp, means whereby said carriers are directed toward the clamp to place the ends of the film under the clamp, and means for automatically shearing said film ends in moving the carriers.

5. An apparatus for joining photographic films, comprising film-end carriers, a joint clamp, means whereby said carriers are directed toward the clamp to place the ends of the film under the clamp, means for automatically shearing said film ends in moving the carriers, and means for automatically applying an adhesive to one of the film ends as it is moved toward the clamp.

6. An apparatus for joining photographic films, comprising film-end carriers, a joint clamp adapted to remain closed on the film ends during relative movement between said clamp and said film carriers, and means for effecting such relative movement between said film carriers and said clamp as will bring the film ends beneath the clamp.

7. An apparatus for joining photographic films, comprising film-end carriers, a joint clamp, means whereby said carriers are moved toward and from the clamp to place the film ends under the clamp, and a wire brush for removing emulsion from one film end.

8. An apparatus for joining photographic films, comprising film-end carriers, a joint clamp, means whereby said carriers are moved toward and from the clamp to place the film ends under the clamp, means for automatically removing emulsion from one of the film ends while it is being moved to the clamp, and means for automatically applying an adhesive to one of said film ends while it is being moved to the clamp.

9. An apparatus for joining photographic films, comprising film-end carriers, a joint clamp, means whereby said carriers are moved toward and from the clamp to place the film ends under the clamp, a brush for removing emulsion from one film end while it is being moved to the clamp, and means for adjusting said brush with respect to the path of movement of the adjacent carrier.

10. An apparatus for joining photographic films, comprising film-end carriers, a joint clamp, means whereby said carriers are moved toward and from the clamp to place the film ends under the clamp, a chamber for an adhesive, in a path adjacent to which the carriers move, said chamber having an opening thereto along the path of movement of one of the film ends, a cover for said opening normally closing same and adapted to be moved responsive to the movement of said film end to be coated, and means in said chamber for applying the adhesive to said film end during its said movement.

11. An apparatus for joining photographic films having perforations in the margins thereof, comprising film-end carriers, means for determining the location of the film ends on the carriers and maintaining the same while the films are secured to the carriers, a joint clamp adapted to clamp the film ends while the carriers are moved away from and toward it, and means whereby said carriers are moved toward the clamp and into positions to place the film ends thereunder with the adjacent perforations of one registering with those of the other.

12. An apparatus for joining photographic films, comprising a joint clamp, film-end carriers, a chamber for an adhesive having an opening, means for effecting relative movement between said chamber and said carriers to cause a film end to project into said chamber to have an adhesive applied thereto before the film is clamped, a cover for the chamber normally closing said opening and adapted to be moved responsive to said relative movement between said film-end carriers and the chamber, for permitting one of the film ends to extend into the chamber, and means in said chamber for applying an adhesive to said film-end.

13. An apparatus for joining photographic films, comprising a plurality of film-end carriers, means for securing the film ends to the carriers, a joint clamp, means to remove emulsion from one film end, means to apply adhesive to the other film end, and means to move said carriers and clamp relative to each other.

14. An apparatus for joining photographic films, comprising a support, a movable carriage mounted thereon, film-end carriers movably mounted on said carriage, a joint clamp, said carriage being arranged to be moved toward and from the joint clamp, means to secure the film ends to the carriers, and means to cause said carriers to move toward each other to bring the film ends under the clamp when the carriage is moved toward the clamp.

15. An apparatus for joining photographic films, comprising a support, a movable carriage mounted thereon, film-end carriers movably mounted on said carriage, a joint clamp, said carriage being arranged to be moved toward and from the joint clamp, means to secure the film ends to the carriers, means to cause said carriers to move toward each other to bring the film ends under the clamp when the carriage is moved toward the clamp, means on one of the carriers to open the clamp as they are moved toward it, and means for automatically closing said clamp.

16. An apparatus for joining photographic films, comprising a support, a movable carriage mounted thereon, film-end carriers movably mounted on said carriage, a joint clamp, said carriage being arranged to be moved toward and from the joint clamp, means to secure the film ends to the carriers, means to cause said carriers to move toward each other to bring the film ends under the clamp when the carriage is moved toward the clamp, means on one of the carriers to open the clamp as they are moved toward it, means for removing emulsion from one film end during the movement of the carriage toward the clamp, means for applying adhesive to one film end during the movement of the carriage toward the clamp, and means for automatically closing said clamp.

17. An apparatus for joining photographic films, comprising a support, a carriage adapted to be moved over said support, a joint clamp, a film-end carrier on each side of said clamp and connected to the carriage, said carriage and film-end carriers being arranged to be moved over the support toward and from the clamp, positioning members on said carriers for positioning the ends of the films relative to each other, holding members on said film-end carriers for holding the ends of the films with relation to the positioning members, cams on said support, cam engaging devices on said carriers, said cams and engaging devices being arranged to move the carriers toward each other when said carriage and carriers are moved toward the clamp, means for removing the emulsion from one side of one film end, means for applying an adhesive to one side of the other film end during the movement of the carriage and carriers toward the clamp, a spring for retaining the clamp in its closed position, and means on one of the carriers for opening the clamp as the carriage and carriers are moved into position with relation to said clamp.

18. An apparatus for joining photographic films, comprising a joint clamp, film-end carriers arranged to be moved toward and from the clamp, means for securing the film ends to the carriers, means for opening the joint clamp, means for closing the joint clamp, and means actuated by the movement of the carriers for releasing the film-ends.

19. An apparatus for joining photographic films, comprising a support, a carriage movable on said support, a joint clamp mounted on said support, film-end carriers movably mounted on said carriage, means on each of said carriages for securing film ends thereto, means for removing emulsion from one side of one film end, means for applying an adhesive to one side of the other film end during the movement of the carriage and carriers toward the clamp, means for moving one of the film-end carriers relative to the other to raise one film end into a plane above the other film end, and means for moving said carriers toward each other to place one film end over the other within the joint clamp.

20. An apparatus for joining photographic films, comprising a support, a carriage movable on said support, a joint clamp mounted on said support, film-end carriers movably mounted on said carriage, means on each of said carriages for securing film ends thereto, means for removing emulsion from one side of one film end, means for applying an adhesive to one side of the other film and during the movement of the carriage and carriers toward the clamp, means for moving one of the film-end carriers relative to the other to raise one film end into a plane above the other film end, means for moving said carriers toward each other to place one film end over the other within the joint clamp, means on one of the film-end carriers for opening the clamp, and a spring for closing said clamp.

21. A film-end carrier for an apparatus for joining photographic films, comprising means for positioning the film end, a clamp for securing said film on the carriage, a shear for cutting off the end of the film, and an operating handle connected to said carrier arranged to actuate the shear when moved in one direction, and to open the clamp and withdraw the positioning device when moved in the other direction to release the film.

22. An apparatus for joining photographic films, comprising a support, a movable carriage mounted thereon, guides on said support for said carriage, film-end carriers movably mounted on said carriage, a joint clamp on the support, cam connections between the support and the film-end carriers for moving said carriers toward each other, film-end clamps on each of said carriers, means on said carriers for moving them longitudinally relative to the support, means on one of said carriers for opening the joint clamp as the film ends approach it, means to close said joint clamp over the film ends placed therein by the carriers, and means actuated by the carrier operating means for releasing the film ends from the carriers after they have been placed in the clamp.

23. An apparatus for joining photographic films, comprising a support, a carriage movably mounted thereon, film-end carriers movably mounted on said carriage, a joint clamp, said carriage being arranged to be moved toward and from the joint clamp, means to secure the film ends to the carriers, a shear on each carrier, means on the support for moving the carriers toward and from each other on the carriage, and means on the carriers for actuating the shears and moving the carriers and carriage toward and from the joint clamp.

24. An apparatus for joining photographic films, comprising a support, a carriage movably mounted thereon, film-end carriers movably mounted on said carriage, a joint clamp, said carriage being arranged to be moved toward and from the joint clamp, means to secure the film ends to the carriers, a shear on each carrier, means on the support for moving the carriers toward and from each other on the carriage, means on the carriers for actuating the shears and moving the carriers and carriage toward and from the joint clamp, a scratch brush for removing emulsion from one side of one film end, means for applying adhesive to one side of the other film end during the movement of the carriers toward the joint clamp, gearing for actuating said brush, and means on the carriage for actuating said gearing.

In testimony whereof I have signed my name to this specification in the presence of two subscribing witnesses.

HENRY RIEGEL EVANS.

Witnesses:
HARRY S. WIDGE,
HAROLD H. SIMMONS.